US005449889A

United States Patent [19]
Samardzija

[11] Patent Number: 5,449,889
[45] Date of Patent: Sep. 12, 1995

[54] APPARATUS, SYSTEM AND METHOD FOR DIELECTRICALLY HEATING A MEDIUM USING MICROWAVE ENERGY

[75] Inventor: Nikola Samardzija, Wilmington, Del.

[73] Assignee: E. I. Du Pont de Nemours and Company, Wilmington, Del.

[21] Appl. No.: 969,593

[22] Filed: Oct. 30, 1992

[51] Int. Cl.⁶ .................... H05B 6/74; H05B 6/80
[52] U.S. Cl. .................. 219/695; 219/696; 219/748; 219/746; 166/60; 166/248
[58] Field of Search .............. 219/10.55 A, 10.55 F, 219/10.55 R, 10.55 M, 690, 691, 695, 696, 697, 748, 750, 746; 166/60, 248; 128/804

[56] References Cited

U.S. PATENT DOCUMENTS

| | | | |
|---|---|---|---|
| Re. 30,738 | 9/1981 | Bridges et al. | 166/248 |
| Re. 31,241 | 5/1983 | Klaila | 431/11 |
| 3,754,111 | 8/1973 | Jurgensen | 219/10.55 A |
| 4,140,179 | 2/1979 | Kasevich et al. | 166/248 |
| 4,164,144 | 7/1979 | Kashyap et al. | 219/691 |
| 4,193,448 | 3/1980 | Jeambey | 219/10.55 A X |
| 4,271,848 | 6/1981 | Turner et al. | 128/804 |
| 4,370,534 | 1/1983 | Brandon | 219/695 |
| 4,376,598 | 3/1983 | Brouns et al. | 405/258 |
| 4,435,292 | 3/1984 | Kirk et al. | 210/747 |
| 4,571,473 | 2/1986 | Wyslouzil et al. | 219/10.55 A |
| 4,590,348 | 5/1986 | Lahti et al. | 219/10.55 M |
| 4,620,593 | 11/1986 | Haagensen | 166/248 |
| 4,632,742 | 12/1986 | Tundo | 204/158.21 |
| 4,670,634 | 6/1987 | Bridges et al. | 219/10.41 |
| 4,777,336 | 10/1988 | Asmussen | 219/696 |
| 4,778,970 | 10/1988 | Klaila | 219/10.55 A |
| 4,853,507 | 8/1989 | Samardzija | 29/10.55 A |
| 4,855,695 | 8/1989 | Samardzija | 333/17.3 |
| 4,973,811 | 11/1990 | Bass | 219/10.57 |
| 4,984,594 | 1/1991 | Vinegar et al. | 134/21 |
| 5,003,144 | 3/1991 | Lindroth et al. | 219/10.55 A |
| 5,065,819 | 11/1991 | Kasevich | 166/248 |
| 5,076,727 | 12/1991 | Johnson et al. | 405/128 |

FOREIGN PATENT DOCUMENTS 6997591 7/1991 Australia.
852300 8/1981 U.S.S.R..

Primary Examiner—Philip H. Leung

[57] ABSTRACT

Microwave energy may be used to dielectrically heat a medium, which can remediate the medium. An apparatus or a system employing this concept is well-suited for various environmental applications, such as in-situ remediation of soil, sludge or spills. The system comprises a microwave energy source having a preselected microwave frequency for emitting microwave energy. The system also comprises a wave-guide section having a cross-section dimensioned in accordance with the wavelength of the microwave frequency for transmitting microwave energy. A broadband mode converter may be disposed in alignment with the wave-guide section. An applicator element is disposed in alignment with the broadband more converter for applying microwave energy directly to the medium without confining the medium, thereby removing contaminants from the medium.

6 Claims, 3 Drawing Sheets

APPARATUS, SYSTEM AND METHOD FOR DIELECTRICALLY HEATING A MEDIUM USING MICROWAVE ENERGY

BACKGROUND OF THE INVENTION

1. Field of the Invention

The present invention relates to a portable apparatus, a system and a method for applying microwave energy directly to a medium in-situ without confining the medium. The apparatus, system and method are well suited for various environmental applications, such as in-situ remediation of soil, sludge or spills.

2. Description of the Prior Art

In applicant's previous patent, U.S. Pat. No. 4,853,507, an apparatus for separating emulsions is disclosed. In this apparatus, emulsions are irradiated with microwave energy through a confining applicator disposed within a wave-guide section, and rapidly heated emulsion is extracted for separation. By contrast, in the present invention, an applicator element of tapered geometry is applied directly to the medium to be heated, without confining the medium. The direct application of microwave energy allows for efficient dielectric heating of large masses of a medium, thus permitting in-situ remediation of large areas of contaminated soil or uncontained chemical spills.

In U.S. Pat. No. 4,067,683, now Reissue Pat. No. 32,241, an applicator element of tapered geometry connected directly to a microwave energy source is disclosed. In this patent, electromagnetic energy is directed toward a confined hydrocarbon fluid, where a metal tank enclosing the applicator element creates a cavity for resonant-type heating, as opposed to application of broad bandwidth radiation as in the present invention. Such a configuration requires that the medium to be heated flows through a holding tank, thus making the configuration unsuitable for use in in-situ remediation of a contaminated area. Reissue Pat. No. 32,241 also discloses, in a further embodiment, directing microwave energy downhole for interaction in a geological substrate. However, for this embodiment, the applicator element must be inserted into a hollow conduit and does not directly contact the medium to be heated.

In U.S. Pat. No. 5,076,727, a system is disclosed for the in-situ de-contamination of spills and landfills by use of focussed microwave/radio frequency (MW/RF) heating in combination with a closed loop vapor flushing and vacuum recovery system. However, the system described in this patent relies on either an above-ground horizontal array of energy sources, which uses induction (or eddy current) principles, or in-situ vertical electrodes. As described, the system refers only to resonant type heating and not the application of broad bandwidth radiation. Such a system exemplifies RF (1 MHz–300 MHz) heating only and makes no attempt to show a practicable embodiment of how to implement radiation in the microwave range (300 MHz and up).

SUMMARY OF THE INVENTION

Accordingly, it is an object of the present invention to design an apparatus, system and method wherein an applicator element having a tapered geometry is applied directly to a medium to be heated, without the medium being confined.

It is also an object of the present invention to design an apparatus, system and method which apply broad bandwidth radiation in the microwave range.

It is a further object of the present invention to provide a portable apparatus which can be easily transported to a treatment site to dielectrically heat or remediate a medium in-situ.

The apparatus, system and method of the present invention are well-suited for various environmental applications, such as in-situ remediation of soil, sludge and spills. The system of the present invention, which includes a vapor recovery unit, can be used in both in-situ and ex-situ operations. In particular, the present invention is useful for surface/subsurface (subsurface meaning up to 100 feet below the surface) remediation, horizontal/vertical remediation, sludge/soil remediation, remediation of waste pits, tank bottom clean-ups, solvent recovery, emulsion breaking, i.e., chemical and petroleum spill cleanup, and insect control.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

To achieve the foregoing objects, and in accordance with the purposes of the invention as embodied and broadly described here, there is provided a portable apparatus for dielectrically heating a medium. The apparatus comprises a microwave energy source having a preselected microwave frequency for emitting microwave energy. The apparatus also comprises a wave-guide section disposed in alignment with the microwave energy source and having a cross-section dimensioned in accordance with the wavelength of the microwave frequency of the microwave energy source for transmitting microwave energy. The apparatus also comprises a broadband applicator element disposed in alignment with the wave-guide section for applying microwave energy directly to the medium without confining the medium, thereby dielectrically heating the medium.

It is further preferable that the apparatus comprise a broadband mode converter disposed between the wave-guide section and the applicator element for propagating the microwave energy from the wave-guide section to the applicator element.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DESCRIPTION OF THE PREFERRED EMBODIMENTS

Reference will now be made in detail to the present preferred embodiment of the invention as illustrated in the accompanying drawings.

Figure 1:
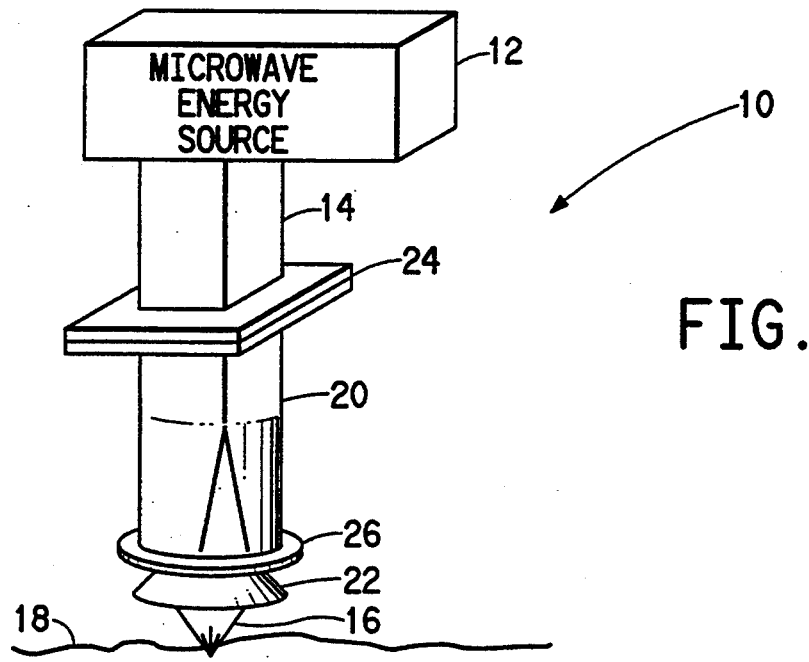
FIG. 1 is an isometric schematic view of an apparatus for dielectrically heating a medium according to a first embodiment of the present invention.

In accordance with a first, or preferred, embodiment, of the present invention, there is provided a portable apparatus for dielectrically heating a medium, shown generally at 10 in FIG. 1. The apparatus of the first embodiment of the present invention is portable so that it can be easily transported and moved to a treatment site. The dielectric heating can remediate the medium. The medium may be, by way of example, soil, sludge or a spill. The medium may exist in a solid, liquid or gaseous state.

The apparatus of the present invention comprises a microwave energy source 12 as shown in FIG. 1. Microwave energy source 12 has a preselected microwave frequency for emitting microwave energy.

The apparatus of the first embodiment of the present invention also comprises a wave-guide section, shown at 14 in FIG. 1, disposed in alignment with the microwave energy source. The wave-guide section has a cross-section dimensioned in accordance with the wavelength of the microwave frequency of the microwave energy source for transmitting microwave energy. A rectangular flange (not shown) is disposed at the outlet of microwave energy source 12 for connecting the energy source to the wave-guide section.

The apparatus of the first embodiment of the present invention also comprises a broadband applicator element, shown at 16 in FIG. 1, for applying microwave energy directly to the medium, shown generally at 18. Applicator element 16 is disposed in alignment with the wave-guide section. In the first embodiment of the present invention as shown in FIG. 1, the wave-guide section has a rectangular cross-section, and the applicator element is conical (i.e., tapered) and has a circular cross-section. With the present invention, there is no need to contain the medium within the applicator element or within the confines of another vessel in order to dielectrically heat the medium. Instead, the applicator element directly couples microwave energy to an unconfined medium.

The apparatus of the first embodiment of the present invention may further comprise a broadband mode converter, shown at 20 in FIG. 1. Broadband mode converter 20 is disposed between the wave-guide section and the applicator element and propagates microwave energy from the wave-guide section to the applicator element. The geometry of the broadband mode converter is such that it provides a transition from the rectangular cross-section of the wave guide section to the circular cross-section of the applicator element.

The apparatus of the first embodiment of the present invention may further comprise an electrically conductive skirt, shown at 22 in FIG. 1, disposed around the wave-guide section and the applicator element. Skirt 22 directs microwave energy to the medium and prevents radiation from propagating into the surrounding environment. Also, a rectangular connecting flange 24 may be disposed between the wave-guide section and the broadband mode converter for connecting section 14 and converter 20, and a circular connecting flange 26 may be disposed between the broadband mode converter and the applicator element for connecting converter 20 and element 16.

Figure 2:
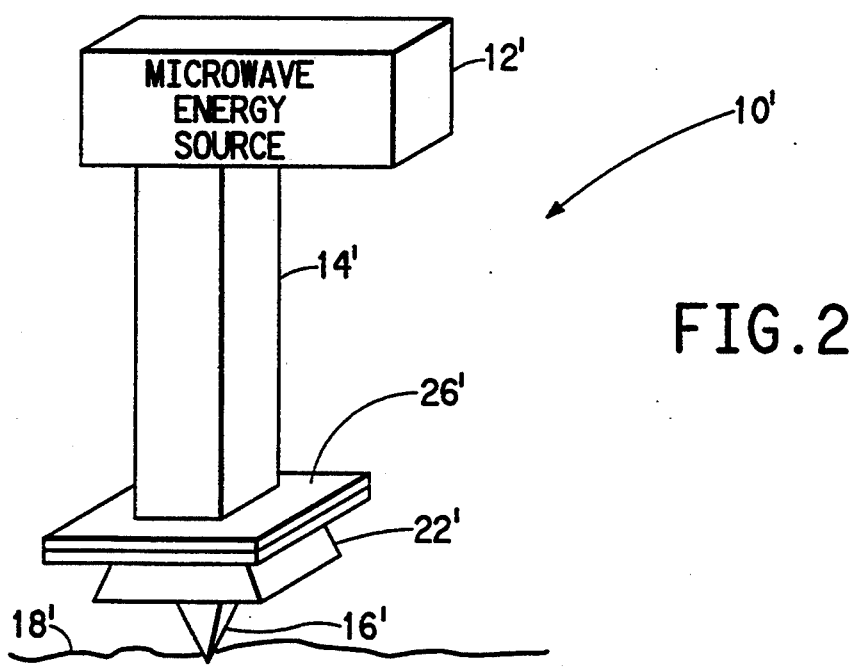
FIG. 2 is an isometric schematic view of an apparatus for dielectrically heating a medium according to a second embodiment of the present invention.

FIG. 2 illustrates a second embodiment of the present invention. Wherever possible, the same reference numerals as those used with respect to the embodiment of FIG. 1 will be used to illustrate like components of the apparatus of the second embodiment, but will be designated with a prime (').

The second embodiment of an apparatus for dielectrically heating a medium is shown generally at 10' in FIG. 2. The apparatus of the second embodiment of the present invention is also portable so that it can be easily transported and moved to a treatment site. As in the first embodiment, the dielectric heating can remediate the medium. The medium may be, by way of example, soil, sludge or a spill. The medium may exist in a solid, liquid or gaseous state.

The apparatus of the second embodiment of the present invention comprises a microwave energy source 12'. Microwave energy source 12' has a preselected microwave frequency for emitting microwave energy. The apparatus of the second embodiment of the present invention also comprises a wave-guide section, shown at 14' in FIG. 2, disposed in alignment with the microwave energy source. As in the first embodiment, the wave-guide section has a cross-section dimensioned in accordance with the wavelength of the microwave frequency of the microwave energy source for transmitting microwave energy. In the embodiment of FIG. 2, the wave-guide section has a rectangular cross-section. A rectangular flange (not shown) is disposed at the outlet of microwave energy source 12' for connecting the energy source to the wave-guide section.

The apparatus of the second embodiment of the present invention also comprises a broadband applicator element, shown at 16' in FIG. 2, for applying microwave energy directly to the medium, shown generally at 18' in FIG. 2. The applicator element of the embodiment of FIG. 2 is pyramidal and has a rectangular cross-section. As in the first embodiment, there is no need to contain the medium within the applicator element or within the confines of another vessel in order to dielectrically heat the medium. Instead, the applicator element directly couples microwave energy to an unconfined medium.

The apparatus of the second embodiment of the present invention may further comprise an electrically conductive skirt, shown at 22' in FIG. 2, disposed around the wave-guide section and the applicator element. Skirt 22' directs microwave energy to the medium and prevents radiation from propagating into the surrounding environment. Also, a rectangular connecting flange 26' may be disposed between the wave-guide section and the applicator element for connecting section 14' and element 16'.

Figure 3:
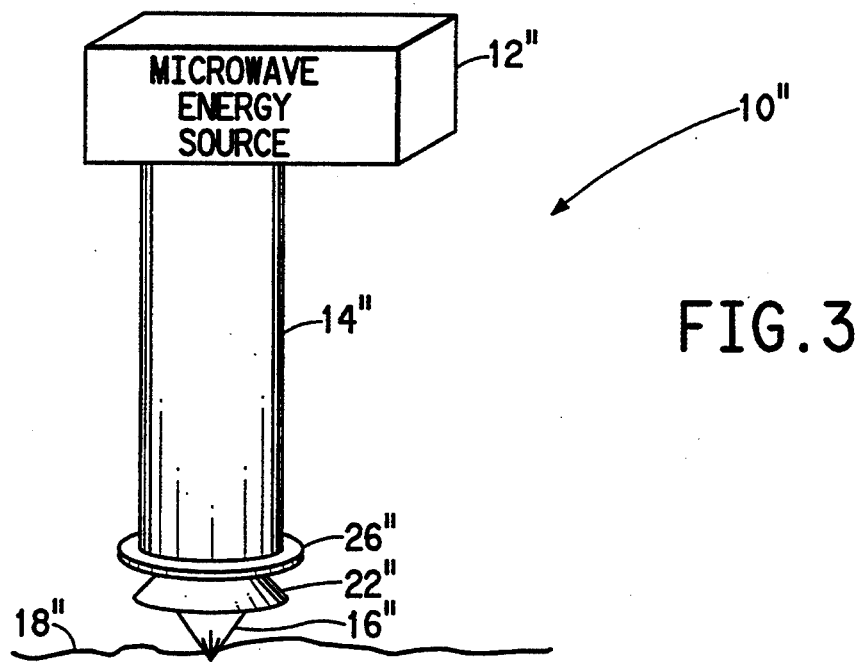
FIG. 3 is an isometric schematic view of an apparatus for dielectrically heating a medium according to a third embodiment of the present invention.

FIG. 3 illustrates a third embodiment of the present invention. Wherever possible, the same reference numerals as those used with respect to the embodiments of FIGS. 1 and 2 will be used to illustrate components like the apparatus of the first and second embodiments, but will be designated with a double prime (").

The third embodiment of the apparatus for dielectrically heating a medium is shown generally at 10" in FIG. 3. The apparatus of the third embodiment of the present invention is also portable so that it can be easily transported and moved to a treatment site. As in the first two embodiments, the dielectric heating can remediate the medium. The medium may be, by way of example, soil, sludge or a spill. The medium may exist in a solid, liquid or gaseous state.

Apparatus 10″ comprises a microwave energy source 12″. As in the first two embodiments, microwave energy source 12″ has a preselected microwave frequency for emitting microwave energy.

The apparatus of the third embodiment of the present invention also comprises a wave-guide section, shown at 14″ in FIG. 3, disposed in alignment with the microwave energy source. As in the first two embodiments, the wave-guide section has a cross-section dimensioned in accordance with the wavelength of the microwave frequency of the microwave energy source for transmitting microwave energy. Wave-guide section 14″ is cylindrical and has a circular cross-section. A circular flange (not shown) is disposed at the outlet of microwave energy source 12″ for connecting the energy source to the wave-guide section.

The apparatus of the third embodiment of the present invention also comprises a broadband applicator element, shown at 16″ in FIG. 3, for applying microwave energy directly to the medium, shown generally at 18″ in FIG. 3. As in the first embodiment of FIG. 1, applicator element 16″ is conical (i.e., tapered) and has a circular cross-section.

As in the first two embodiments, in the embodiment of FIG. 3 there is no need to contain the medium within the applicator element or within the confines of another vessel in order to dielectrically heat the medium. Instead, the applicator element directly couples microwave energy to an unconfined medium.

The apparatus of the third embodiment of the present invention may further comprise an electrically conductive skirt, shown at 22″ in FIG. 3, disposed around the wave-guide section and the applicator element. Skirt 22″ directs microwave energy to the medium and prevents radiation from propagating into the surrounding environment. A circular connecting flange 26″ may be disposed between the wave-guide section and the applicator element for connecting section 14″ and element 16″.

Figure 4:
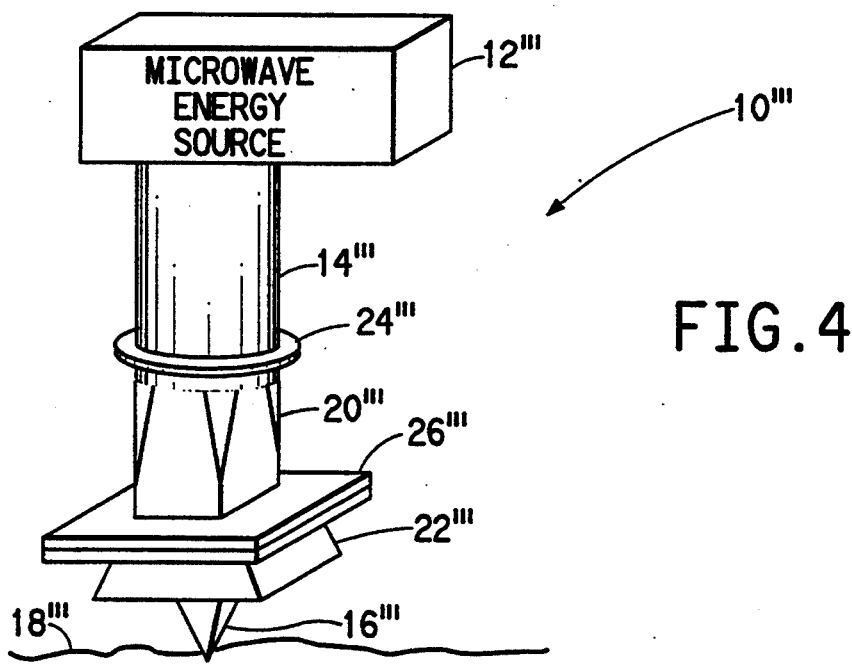
FIG. 4 is an isometric schematic view of an apparatus for dielectrically heating a medium according to a fourth embodiment of the present invention.

FIG. 4 illustrates a fourth embodiment of the present invention. Wherever possible, the same reference numerals as those used with respect to the embodiments of FIGS. 1-3 will be used to illustrate components like the apparatus of the first through third embodiments, but will be designated with a triple prime (‴).

The fourth embodiment of the apparatus for dielectrically heating a medium is shown generally at 10‴ in FIG. 4. The apparatus of the fourth embodiment of the present invention is also portable so that it can be easily transported and moved to a treatment site. As in the first three embodiments, the dielectric heating can remediate the medium. The medium may be, by way of example, soil, sludge or a spill. The medium may exist in a solid, liquid or gaseous state.

Apparatus 10‴ comprises a microwave energy source 12‴. As in the first three embodiments, microwave energy source 12‴ has a preselected microwave frequency for emitting microwave energy.

The apparatus of the fourth embodiment of the present invention also comprises a wave-guide section, shown at 14‴ in FIG. 4, disposed in alignment with the microwave energy source. As in the first three embodiments, the wave-guide section has a cross-section dimensioned in accordance with the wavelength of the microwave frequency of the microwave energy source for transmitting microwave energy. Like the embodiment of FIG. 3, the wave-guide section of FIG. 4 is cylindrical and has a circular cross-section. A circular flange (not shown) is disposed at the outlet of microwave energy source 12‴ for connecting the energy source to the wave-guide section.

The apparatus of the fourth embodiment of the present invention also comprises a broadband applicator element, shown at 16‴ in FIG. 4, for applying microwave energy directly to the medium, shown generally at 18‴ in FIG. 4. The applicator element of the embodiment of FIG. 4 is pyramidal and has a rectangular cross-section, like the embodiment of FIG. 2.

As in the embodiments of FIGS. 1-3, in the embodiment of FIG. 4 there is no need to contain the medium within the applicator element or within the confines of another vessel in order to dielectrically heat the medium. Instead, the applicator element directly couples microwave energy to an unconfined medium.

The apparatus of the fourth embodiment of the present invention may further comprise a broadband mode converter, shown at 20‴ in FIG. 4. Broadband mode converter 20‴ is disposed between the wave-guide section and the applicator element and propagates the microwave energy from the wave-guide section to the applicator element. The geometry of the broadband mode converter is such that it provides a transition from the circular cross-section of the wave guide section to the rectangular cross-section of the applicator element.

The apparatus of the fourth embodiment of the present invention may further comprise an electrically conductive skirt, shown at 22‴ in FIG. 4, disposed around the wave-guide section and the applicator element. Skirt 22‴ directs microwave energy to the medium and prevents radiation from propagating into the surrounding environment. Also, a circular connecting flange 24‴ may be disposed between the wave-guide section and the broadband mode converter for connecting section 14‴ and converter 20‴ and a rectangular connecting flange 26‴ may be disposed between the broadband mode converter and the applicator element for connecting converter 20‴ and element 16‴.

In accordance with the present invention, there is provided a method for dielectrically heating a medium. The method comprises the step of disposing an applicator element in contact with the medium for conducting microwave energy from a microwave energy source directly to the medium. The energy is conducted to the medium without confining the medium, thereby dielectrically heating the medium. The disposing step may comprise embedding the applicator element in soil, sludge or a spill for remediating any of these mediums. When the applicator element is used to remediate soil, the disposing step comprises the sub-steps of forming a bore-hole in the soil and placing the applicator element at a predetermined depth in the bore-hole.

Figure 5:
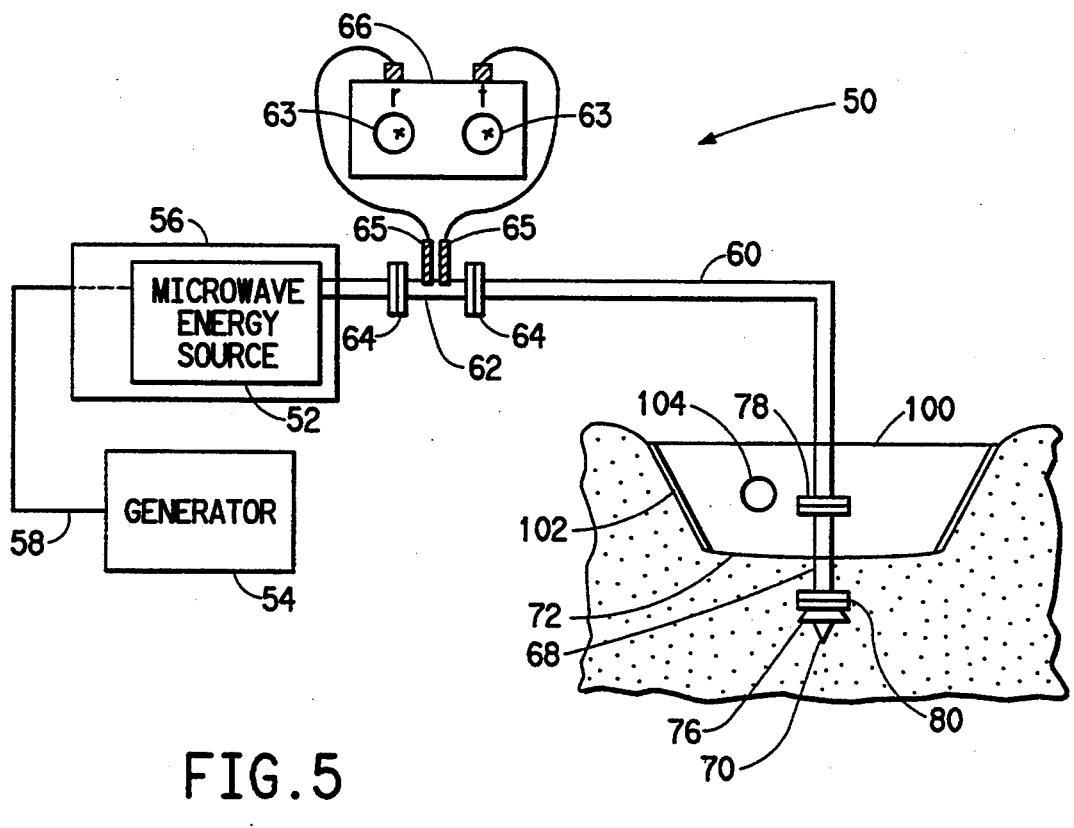
FIG. 5 is a partial, cross-sectional and schematic view of a system for remediating a medium according to the present invention, taken along lines 5—5 in FIG. 6.

In accordance with the present invention, there is provided a system for remediating a medium, shown generally at 50 in FIG. 5. The system shown in FIG. 5 is a preferred arrangement of a system for remediating soil, and was used in the Example as described below. However, the medium may also be, by way of example, sludge, or a spill. As in the previous embodiments, the medium may exist in a solid, liquid or gaseous state.

As shown in FIG. 5, system 50 comprises a microwave energy source 52. An example of a microwave energy source suitable for use with the system of the present invention is a 6 KW, 2450 MHz generator which is commercially available from Cober Electronics, Inc. of Stamford, Conn. In this preferred arrangement, energy source 52 requires 1.5 gallons per minute of water to cool a magnetron tube and a built-in circulator, which are inside the microwave energy source. Energy source 52 is powered by a stand-by diesel generator 54 and is disposed in a trailer 56. Generator 54 is connected to trailer 56 by a feed line 58, which in the preferred arrangement of this system is a 3-phase, 440 V, electric-feed line. In the absence of generator 54, power may be delivered to microwave energy source 52 from the local utility company through feed line 58. In this preferred arrangement, the trailer is located about 65 feet from the actual test location.

The system of the present invention also comprises a wave-guide section, shown at 60 in FIG. 5. As in the above embodiments, the cross-section of the wave-guide section is dimensioned in accordance with the wavelength of the microwave frequency of the microwave energy source for transmitting microwave energy. In this preferred arrangement, wave-guide section 60 has a rectangular cross-section. A rectangular flange (not shown) is disposed at the outlet of microwave energy source 52 for connecting the energy source to the wave-guide section. A wave-guide section which is suitable for use in the preferred arrangement of the system of FIG. 5 is a WR-340 wave-guide, commercially available from Microwave Development Laboratories, Inc. of Natick, Mass., which is made of aluminum and is 65 feet long. In this preferred arrangement, the WR-340 wave-guide section is designed for high-quality power transmission at the selected frequency of 2450 MHz, with a low insertion loss. As such, it can be used in outdoor applications.

As shown in FIG. 5, wave-guide section 60 is connected to microwave energy source 52 by a coupler 62, which in the preferred arrangement is a directional coupler, commercially available from Microwave Development Laboratories, Inc. of Natick, Mass. The coupler comprises a flange 64 and two crystal detectors 65, commercially available from Loral Microwave - Narda, Inc., of Hauppauge, N.Y. A transmitted and reflected power monitor 66 is placed in connection with coupler 62. The power monitor is used to monitor forward and reflected microwave power.

The system of the present invention also comprises a broadband mode converter, shown at 68 in FIG. 5. Broadband mode converter 68 is disposed in alignment with wave-guide section 60 and propagates microwave energy from the wave-guide section. As in the embodiment of FIG. 1, the geometry of the broadband mode converter is such that it provides a transition from the rectangular cross-section of the wave-guide section to the circular cross-section of the applicator element.

The system of the present invention also comprises a conical (i.e., tapered) applicator element, shown at 70 in FIG. 5, for applying microwave energy directly to the medium. Applicator element 70 is a broadband device. In this preferred arrangement, applicator element 70 is conical and has a circular cross-section. The applicator element is disposed in alignment with broadband mode converter and applies microwave energy directly to the medium, shown at 72 in FIG. 5. The geometry of the broadband mode converter is such that it provides a transition from the rectangular cross-section of the wave guide section to the circular cross-section of the applicator element. Optionally, applicator element 70 may be enclosed in a ceramic casing in order to prevent thermal diffusion through the wave-guide section.

In the preferred arrangement of the system of the present invention, the insertion loss, or power absorbed by the wave-guide section, was determined to be about 7% of the input power to the wave-guide section. Thus, in the preferred arrangement of the system of FIG. 5, 5 kW applied by the microwave energy source produces, on average, 4.65 kW at the applicator element.

Figure 6:
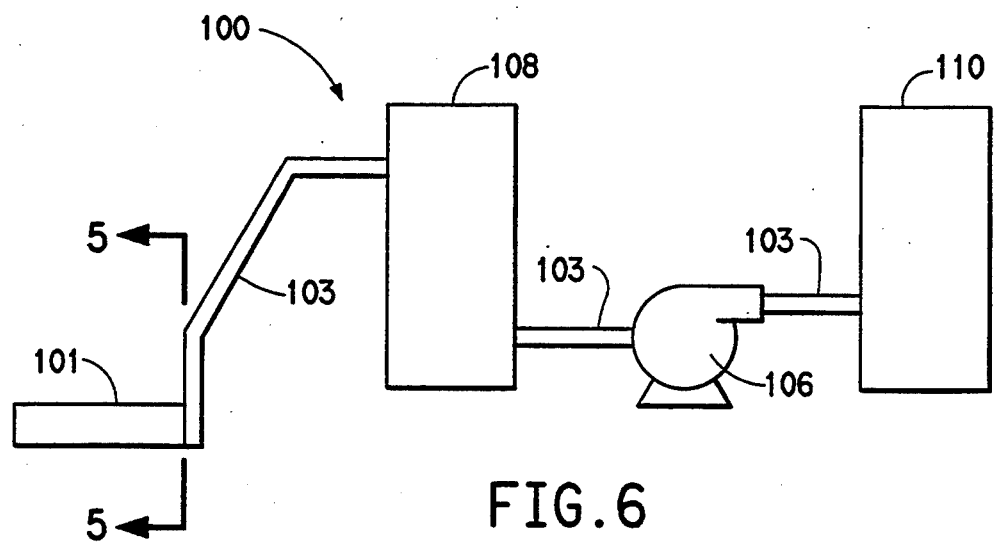
FIG. 6 is a schematic view of the contaminant recovery unit of the system of the present invention as shown in FIG. 5.

As in the embodiments of FIGS. 1-4, with the embodiment of FIGS. 5 and 6 there is no need to contain the medium within the applicator element or within the confines of another vessel in order to dielectrically heat the medium. Instead, the applicator element directly couples microwave energy to an unconfined medium. Since the applicator element is a broadband device which does not absorb microwave energy, it provides a nearly perfect coupling of microwave energy into the medium. Therefore, under normal operating conditions, the reflected power monitor produces an insignificant reading (i.e., 10% or less of transmitted power). For example, for 4.65 kW at the applicator element, the reflected power is substantially less than 500 W. This implies that most of the microwave power is converted into heat.

The system of the present invention also comprises a contaminant recovery unit shown generally at 100 in FIG. 5 and in detail in FIG. 6. FIG. 5 is a partial cross-sectional view of the unit of FIG. 6, taken across lines 5—5 of FIG. 6 and showing part of the recovery unit. As shown in FIG. 5, contaminant recovery unit 100 is disposed in alignment with applicator element 70. When the medium is heated by the applicator element, the heated medium volatilizes organic constituents, as well as inorganic ones, such as water. Contaminant recovery unit 100 is necessary when contaminants removed from the medium are toxic. In the preferred arrangement of the system of the present invention, the contaminant recovery unit comprises a hood 102 as shown in FIG. 5 disposed over the area of the medium remediated for trapping toxic emissions produced by removing contaminants from the medium. Preferably, the hood is made of heavy grade plastic sheets having a thickness of greater than 6 mil. When the remediated area is a ditch, the sheets are supported by boards placed across and raised slightly above the ditch, by about 12 to 18 inches. The ends of the sheets are wrapped around the boards to keep them in place. A slotted pipe 101, which is preferably made of polyvinyl chloride (PVC), is inserted under hood 102 through an opening 104 as shown in FIG. 5. A three or four inch hole is cut in one side of the plastic sheets to provide access for slotted pipe 101. The opposite side of each sheet is punctured to provide fresh air to flow into the hood. Slotted pipe 101 is connected to an intake pipe 103, which is in turn connected to a regenerative blower 106 as shown in FIG. 6. Intake pipe 103 is also preferably made of polyvinyl chloride (PVC). At the beginning of the treatment of the medium, negative (<atmospheric) pressure is maintained inside the hood using the regenerative blower. An example of a regenerative blower suitable for use with the present invention is a DR 454 regenerative blower, commercially available from EG & G Industrial Division of Rotron, Inc., located in Saugarties, N.Y. After leaving the blower, vapors are sent through pipe 103 to a moisture separation unit 108 and then through pipe 103 to a carbon filtration unit 110 as shown in FIG. 6 in which toxic volatiles in the vapors are absorbed.

The system of the present invention may optionally further include an electrically conductive skirt, shown at 76 in FIG. 5, disposed around the wave-guide section and the applicator element. Skirt 76 directs microwave energy to the medium and prevents radiation from propagating into the surrounding environment. The system may also include a rectangular connecting flange 78 disposed between the wave-guide section and the broadband mode converter for connecting section 60 and converter 68 and a circular connecting flange 80 disposed between the broadband mode converter 68 and the applicator element 70 for connecting converter 68 and element 70.

In any of the above embodiments of the apparatus or the system of the present invention, the applicator element may be either solid or hollow. The hollow or solid applicator element may be made of a low dielectric constant material. This material may be, by way of example, and not meant to be exhaustive, ceramic, quartz or silicon rubber. For low-temperature applications (less than 110° C.), the low dielectric constant material may be polytetrafluoroethylene, sold under the trademark "TEFLON" (hereinafter referred to as TEFLON) by E.I. du Pont de Nemours and Company of Wilmington, Del. For higher temperature applications (greater than 110° C.), ceramic or quartz materials are recommended. It is also important to know the composition of the medium treated. If the composition is not uniform, independent of temperature considerations, ceramic or quartz are again recommended, as the constituents of the composition may exhibit a diverse dielectric behavior.

The operation of the system of the present invention will now be described. The applicator element is placed in the medium. The applicator element efficiently couples microwave energy into the medium. This energy is converted into heat based on the dielectric properties of the treated medium. In the preferred embodiment of the system of the present invention, it is possible for the temperature of soil to reach 300° C., due to dielectric heating. When the treated medium is dielectrically heated, thermal diffusion is initiated, and heat diffuses through the medium to remediate the medium.

The invention will be clarified by the following example, which is intended to be purely exemplary of the invention.

EXAMPLE

The system described immediately above was tested in a ditch contaminated with chlorinated aliphatic hydrocarbons. The medium treated was soil found primarily at the bottom of the ditch and comprised mostly saturated clay contaminated with tetrachloroethylene (PCE). Microwave energy from the microwave energy source was conducted to the medium through the wave guide section, the broadband mode converter and the TEFLON applicator element. The soil was dielectrically heated to a temperature in the range of 90° C. to 120° C., the latter temperature being the boiling temperature of PCE. The PCE was volatized and reclaimed by the contaminant recovery unit. The extent of the medium which the system remediated (radius of influence) was in excess of one foot.

Additional advantages and modifications will readily occur to those skilled in the art. The invention in its broader aspects is, therefore, not limited to the specific details, representative apparatus and illustrative example shown and described. Accordingly, departures may be made from such details without departing from the spirit or scope of the general inventive concept as defined by the appended claims and their equivalents.

We claim:
1. A system for remediating a medium, comprising:
   (a) a microwave energy source having a preselected microwave frequency for emitting microwave energy;
   (b) a wave-guide section disposed in alignment with the microwave energy source and having a rectangular cross-section dimensioned in accordance with the wavelength of the microwave frequency of the microwave energy source for transmitting microwave energy;
   (c) a broadband mode converter disposed in alignment with the wave-guide section for propagating the microwave energy from the wave-guide section;
   (d) a conical applicator element having a cylindrical cross-section disposed in alignment with the broadband mode converter for applying the microwave energy directly to the medium without confining the medium, thereby removing contaminants from the medium; and
   (e) a contaminant recovery unit disposed in alignment with the applicator element for collecting the contaminants removed from the medium.

2. The apparatus of claim 1, further including an electrically conductive skirt disposed around the wave-guide section and the applicator element for directing microwave energy to the medium and for preventing radiation from propagating into the surrounding environment.

3. The apparatus of claim 1, wherein the applicator element is hollow.

4. The apparatus of claim 1, wherein the applicator element is solid.

5. The apparatus of one of claims 3 or 4, wherein the applicator element is made of a low dielectric constant material.

6. The apparatus of claim 5, wherein the low dielectric constant material is polytetrafluoroethylene.

* * * * *